United States Patent [19]
Wise et al.

[11] Patent Number: 5,377,524
[45] Date of Patent: Jan. 3, 1995

[54] SELF-TESTING CAPACITIVE PRESSURE TRANSDUCER AND METHOD

[75] Inventors: Kensall D. Wise, Ann Arbor, Mich.; Steve T. Cho, Arlington, Mass.

[73] Assignee: The Regents of the University of Michigan, Ann Arbor, Mich.

[21] Appl. No.: 902,328

[22] Filed: Jun. 22, 1992

[51] Int. Cl.⁶ ............................................. G01F 1/38
[52] U.S. Cl. .................................. 73/4 R; 73/861.42; 73/861.47
[58] Field of Search ............... 73/4 R, 861.42, 861.43, 73/861.44, 861.47

[56] References Cited

U.S. PATENT DOCUMENTS

| | | | |
|---|---|---|---|
| 2,919,578 | 1/1960 | Sink | 73/861.44 |
| 3,407,658 | 10/1968 | Kerbow et al. | 73/861.44 |
| 3,593,576 | 7/1971 | Greer | 73/861.44 |
| 3,882,723 | 5/1975 | Wickham | 73/861.47 |
| 4,413,530 | 11/1983 | Guadagnin et al. | 73/861.47 |
| 4,479,070 | 10/1984 | Frische et al. | 73/861.47 |
| 4,484,479 | 11/1984 | Eckhardt | 73/861.47 |
| 4,526,041 | 7/1985 | Beller et al. | 73/861.47 |
| 4,754,651 | 7/1988 | Shortridge et al. | 73/4 R |
| 4,825,747 | 5/1989 | Bardin et al. | 73/861.47 |
| 5,082,242 | 1/1992 | Bonne et al. | 251/129.01 |
| 5,149,673 | 9/1992 | MacDonald et al. | 437/192 |

OTHER PUBLICATIONS

W. H. Ko "Development of a Miniature Pressure Transducer for Biomedical Applications," IEEE Transactions on Electron Devices, vol. ED-26, No. 12, pp. 1896–1905 (Dec. 1979).

J. M. Borkey and K. D. Wise "Integrated Signal Conditioning for Silicon Pressure Sensors," IEEE Transactions on Electron Devices, vol. ED-26, No. 12, 1906–1910 (Dec. 1979).

M. J. S. Smith and J. D. Meindl "Exact Analysis of the Schmitt Trigger Oscillator" IEEE Journal of Solid-State Circuits, vol. SC-19, No. 6, Dec. 1984, pp. 1043–1046.

Y. S. Lee and K. D. Wise, "A Batch-Fabricated Silicon-Capacitive Pressure Transducer with Low Temperature Sensitivity", IEEE Transactions on Electron Devices, vol. ED-29, No. 1, pp. 42–48 (Jan. 1982).

W. H. Ko et al., "A High–Sensitivity Integrated–Circuit Capacitive Pressure Transducer," IEEE Transactions on Electron Devices, vol. ED-29, No. 1, pp. 48–56 (Jan. 1982).

M. Esashi et al., "Fabrication of Catheter–Tip and Sidewall Miniature Pressure Sensors," IEEE Transactions on Electron Devices, vol. ED-29, No. 1, pp. 57–63 (Jan. 1982).

B. E. Burns et al., "Fabrication Technology for a Chronic In–vivo Pressure Sensor," IEDM, San Francisco, Calif., pp. 210–212 (Dec. 1984).

(List continued on next page.)

*Primary Examiner*—Hezron E. Williams
*Assistant Examiner*—George M. Dombroske
*Attorney, Agent, or Firm*—Harness, Dickey & Pierce

[57] ABSTRACT

A high-performance switched-capacitor circuit for electronic read-out of a pressure sensor-based ultrasensitive microflow transducer. The microflow transducer uses a differential capacitive pressure sensor to measure flow. Read-out electronics associated with the transducer feature a clocking speed of 100 KHz and drive loads up to 35 pF. The read-out electronics include a high DC gain that nulls out stray input capacitance, which is beneficial for the multichip realization of the microflow transducer disclosed herein. The uncompensated linearity of the overall read-out electronics is 10 bits, and the pressure/flow resolution is 12 bits. An ultrasensitive membrane associated with the pressure sensor does not respond to a pulsed waveform for frequencies above 50 KHz. But for lower frequencies, it deflects in response to the time-average voltage applied across the capacitor plates of the pressure sensor. A self-test mode is provided which employs an extremely long pre-charge pulse. An integrated flowmeter package including transducer and circuitry, and a second circuit for extending the range of the microflowmeter circuitry are also disclosed.

12 Claims, 5 Drawing Sheets

OTHER PUBLICATIONS

H. Guckel et al., "Laser–Recrystallized Piezoresistive Micro–Diaphragm Sensor,"Transducer '85, Philadelphia, Pa., pp. 182–185, (Jun. 1985).

R. S. Hijab and R. S. Muller, "Micromechanical Thin–Film Cavity Structures for Low Pressure and Acoustic Transducer Applications," Transducer '85, Philadelphia, Pa., pp. 178–181 (Jun. 1985).

K. Najafi, K. D. Wise and T. Mochizuki, "A High–Yield IC–Compatible Multichannel Recording Array,", IEEE Transactions on Electron Devices, vol. ED–32, No. 7, pp. 1206–1211 (Jul. 1985).

I. H. Choi and K. D. Wise, "A Silicon–Thermopile–Based Infrared Sensing Array for Use in Automated Manufacturing," IEEE Transactions on Electron Devices, vol. ED–33, No. 1, pp. 72–79 (Jan. 1986).

K. D. Wise and H. Chau, "Scaling Limits in Batch–Fabricated Silicon Pressure Sensors," IEEE Transactions on Electron Devices, vol. ED–34, No. 4, pp. 850–858 (Apr. 1987).

T. A. Nunn and J. B. Angell, "An IC Absolute Pressure Transducer With Built–In Chamber," Indwelling & Implantable Pressure Transducers, pp. 133–136 (CRC Press, 1977).

K. D. Wise and S. K. Clark, "Diaphragm Formation and Pressure Sensitivity In Batch Fabricated Silicon Pressure Sensors," IEDM Digest Technical Papers, pp. 96–99 (Dec. 1978).

Samaun, K. D. Wise and J. B. Angell, "An IC Piezoresistive Pressure Sensor for Biomedical Instrumentation," IEEE Transactions on Biomedical Engineering, vol. BME–20, No. 2, pp. 101–109 (Mar. 1973).

James L. McCreary and David A. Sealer, "Precision Capacitor Ratio Measurement Technique for Integrated Circuit Capacitor Arrays" IEEE Transactions On Instrumentation And Measurement, vol. IM–28, No. 1, Mar. 1979, pp. 11–17.

Kenzo Watanabe, "A Switched–Capacitor Digital Capacitance Bridge", IEEE Transactions on Instrumentation And Measurement, vol. IM–33, No. 4, Dec. 1984, pp. 247–251.

S. T. Cho, D. Najafi, C. L. Lowman & K. D. Wise, "An Ultrasensitive Silicon Pressure–Based Microflow Sensor", IEDM Digest, Dec., 1989, pp. 489–502.

S. T. Cho, K. Najafi & K. D. Wise, "Scaling and Dielectric Stress Compensation of Ultrasensitive Boron–Doped Silicon Microstructures", Proc. IEEE Workshop on Microelectromechanical Systems, Feb. 1990, pp. 50–55.

H. V. Allen, S. C. Terry, D. W. De Bruin, "Self–testable Accelerometer Systems", Proc. IEEE Conferences on Microelectromechanical Systems, Salt Lake City, Utah, Feb. 20–22, 1989, pp. 113–115.

D. W. De Bruin, H. V. Allen, S. C. Terry "Second–order Effects in Self–testable Accelerometers", Proc. IEEE Workshop on Microelectromechanical Systems, Feb. 1990, pp. 149–152.

F. Krummenacher, "A High Resolution Capacitance to Frequency Converter", IEEE Journal of Solid State Circuits, vol. SC–20, No. 3, Jun., 1985.

M. Smith, L. Bowman and J. Meindel, "Analysis, Design and Performance of a Capacitive Pressure Sensor IC", IEEE Trans. on Biomedical Eng., vol. BME–33, No. 2, pp. 163–174, Feb., 1986.

C. S. Sander, J. W. Knutti, and J. Meindl "A Monolithic Capacitive Pressure Sensor with Pulsed–Period Output", IEEE Trans. Electron Devices, vol. ED–27, pp. 927–930, May, 1980.

G. J. Yeh, I. Dendo, and W. H. Ko, "Switched Capacitor Interface Circuit for Capacitive Transducers," Transducers '85, pp. 60–63, Jun. 1985.

K. Watanabe and W. S. Chung, "A Switched–Capacitor Interface for Intelligent Capacitive Transducers", IEEE Trans. on Instrum. and Measurement, vol. IM–35, pp. 472–476, Dec., 1986.

Y. E. Park and K. D. Wise, "An MOS Switched Capacitor Readout Amplifier for Capacitive Pressure Sensors", IEEE Custom Integrated Circuits Conf. Dig. Tech. Papers, pp. 380–384, 1983.

SELF-TESTING CAPACITIVE PRESSURE TRANSDUCER AND METHOD

BACKGROUND OF THE INVENTION

1. Field of the Invention

The present invention relates in general to transducers utilizing a micromachined sensor and a dedicated electronic read-out circuit with self-test capability, and in particular to transducers having a solid-state capacitive pressure sensor and dedicated high-performance read-out circuit on-chip which electronically creates an electrostatic force for self-testing.

2. Description of Related Art

The monitoring and control of pressure and/or gas flow is of critical importance in a variety of industrial processes, including those associated with semiconductor manufacturing. However, in low-pressure applications such as molecular beam epitaxy (MBE), chemical vapor deposition (CVD), and reactive ion etching (RIE), there is a need to extend the precision of flow control further into the sub-SCCM (standard cubic centimeters per minute) range. Present flowmeters typically require the heating or process gases and offer a full-scale range of about one SCCM and a minimum resolution on the order of $10^{-2}$ SCCM. Such flowmeters lack desired precision for may process applications and are unsuitable for gases which begin to decompose slightly above room temperature.

In recent articles about our research, we reported a new ultrasensitive microflow sensor capable of improving flow resolution by five orders of magnitude. This work is described in the papers cited as References 1 and 2 at the end of this patent application. This microflowmeter is based upon the measurement of pressure to determine the flow rate and does not require the heating of process sensitive gases. The structure is fabricated using silicon micromachining techniques and can be scaled over a wide range of flow and pressure response.

A solid-state micromachined capacitive pressure sensor is described in U.S. Pat. No. 4,815,472, which is assigned to the assignee of the present invention, and hereby incorporated by reference. In that patent, there is described a solid-state pressure sensor made using a single-sided dissolved wafer process, which is suitable for use as the capacitive pressure sensor in the self-testable transducer system of the present invention.

Advances in the electronics used with the micromachined, solid-state silicon single-crystal pressure sensors described in the foregoing patent and our above-mentioned microflowmeter are desired to improve transducer performance. We have recognized that the read-out electronics are a critical part of improving the performance of sensing systems which use capacitive solid-state pressure sensors, as will shortly be discussed in more detail.

Self-testability in micromachined sensors has now also been proposed, but only a few implementations for this desirable concept have been put forward. The self-testability in micromachined accelerometers has been discussed in a few articles, see References 3 and 4. Reference No. 3, for example, discloses a circuit which is intended to self-test a piezoresistive accelerometer by using voltage supply signals of ±16 volts, which is three times larger than the usual ±five volt supplies provided to miniature transducers.

Read-out electronics form a critical part of the sensing system in capacitive solid-state pressure sensors. In general, there are three basic circuit techniques which have been reported in measuring capacitance: capacitance bridges [see References 5 and 6], relaxation oscillators [see References 7 through 10], and switched capacitors [see References 11 through 13]. Capacitance bridges are based on measuring the charge ratio among several capacitors in a bridge configuration. Although they are simple to implement, the capacitive bridge circuits are highly sensitive to stray capacitance. Furthermore, these circuits typically employ components with high temperature sensitivity, such as diodes or bipolar transistors. Relaxation oscillators work on the principle that capacitors are energy storage elements with charging time constants that are a function of their capacitive value. However, relaxation oscillators also have high temperature sensitivity and the circuits used to measure the frequency are typically slow.

Figure 1:
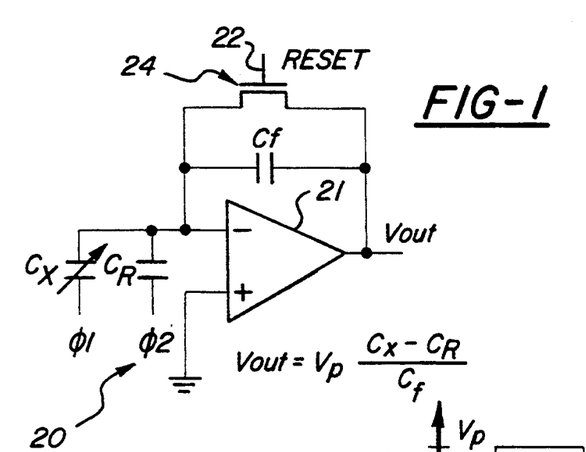
FIG. 1 is a circuit diagram of a conventional switched capacitor read-out circuit, showing the reference and integrating capacitors $C_{ref}$ and $C_f$ and a conventional operational amplifier.
Figure 2:
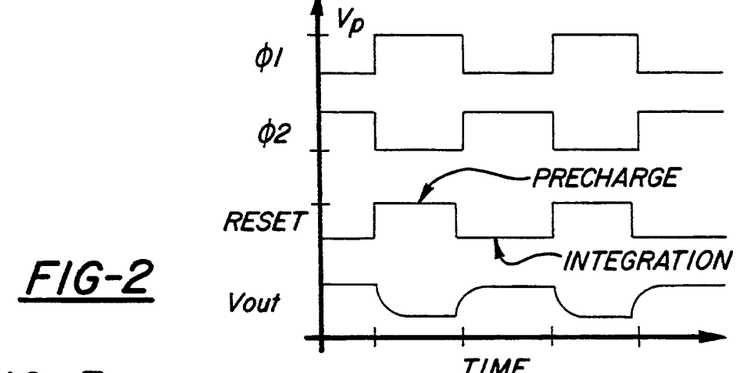
FIG. 2 is a timing diagram showing the basic timing relationships in the FIG. 1 circuit between the clock signals, and the precharge and integrating portions of the reset signal pulses.

Switched-capacitor circuits are based on converting a charge difference into a voltage using an integrator. A typical circuit 20 is illustrated in FIG. 1, where the positive input of operational amplifier 21 is tied to ground. As the phase 1 signal ($\phi 1$) and RESET signal (applied to the gate 22 of solid-state switch 24) go high, the adjustable capacitor $C_x$ responsive to some external force or pressure is charged up and the output is set to ground. As the phase 1 signal goes low, the charge difference between the capacitor $C_x$ and the reference capacitor $C_{ref}$ is integrated across the integrating capacitor $C_f$ by normal operation of the operational amplifier, resulting in a voltage output signal $V_{out}$ proportional to the total integrated charge difference in a matter of a few tenths of microseconds. The major advantage to this circuit technique is its low sensitivity to parasitics and temperature, and its high speed.

We have reported that our ultrasensitive pressure-based microflowmeter has a potential dynamic range extending over five orders of magnitude, and has a resolution which appears to exceed 16 bits. Although the transducer performance has been characterized [see References 1 and 2], the related issue of providing a correspondingly high-performance electronic read-out for this ultrasensitive microflowmeter has yet to be addressed.

It is a primary object of the present invention to provide for a switched capacitor electronic read-out circuit having a range of at least 10 bits for use with the ultrasensitive microflowmeter described in References 1 and 2.

A related object of the present invention is to handle the problems caused by electrostatic forces generated during the read-out of the microflowmeter's capacitive sensor, so that these forces do not perturb or modify the actual output value.

Still further, it is an object of the present invention, in light of electrostatic forces which can be generated by charging the plates of a capacitive pressure sensor, to provide a circuit which makes self-testing of the capacitive pressure sensor possible.

Another object of the present invention was to develop a simple switched capacitor circuit with a simple high performance operational amplifier capable of being utilized in self-test mode.

Another object is to provide a switched capacitor circuit which includes means for automatically selecting an appropriately sized integrating capacitor to use, depending upon sensed conditions, thereby extending the range of the electronic read-out system.

Yet another object is to provide a dedicated electronic read-out circuit which can be interfaced with one or more standard bus interfaces for communications with a host process controller.

Another object is to provide a switched capacitor electronic read-out circuit which automatically selects an approximately sized integration capacitor from a plurality of choices.

SUMMARY OF THE INVENTION

In considering how to make more effective use of capacitor pressure transistors and take advantage of the extended range of the microflowmeter, we considered a number of issues related to improving the accuracy and ruggedness of electronic circuits and packages used and useable with micromachined structures. In an effort to choose an optimal read-out scheme, the transducer requirements for our microflowmeter were carefully considered. Although circuit features such as low pin count, small die size, and low power consumption are certain desirable performance characteristics, they are not critical for this application. The most important characteristics for this circuit are: i) high resolution (>10 bits), ii) insensitivity to parasitic capacitance, and iii) compatibility with the implementation of a self-test mode.

A unique feature of ultrasensitive pressure transducers is that the membrane deflects in response to small (>2 V) applied voltages. Therefore, one aspect of the present invention was our recognition of the potential to implement a built-in self test mode with the read-out electronics. A "self test" is defined here to be a constant pressure signal applied to the device. By measuring the response to this calibrated signal, the device sensitivity and drift can be monitored over time. In order to generate this self-test voltage, the circuitry of the present invention selectively applies a long >2 V signal across the capacitor plates during measurement, which signal is longer than the membrane response time. Our read-out electronics are able to generate a long pulse or a dc bias in order to take advantage of this electrostatic feature.

The switched capacitor circuit of the present invention offers several advantages over the relaxation oscillator approach. The main advantage to the relaxation oscillator is its potential for higher resolution by increasing the resolution of the frequency measurement; however, our switched-capacitor circuit is also highly accurate (>10 bits). Our switched capacitor circuit also nulls out stray parasitic capacitance, while the relaxation oscillator does not. Further, our switched capacitor circuit is capable of and does generate long pulses to implement a self-test mode. Since the relaxation oscillator switches when it reaches a high level voltage, it never truly generates a pulse; it can only generate a spike. Switched-capacitor circuits are also known to be less temperature sensitive than the relaxation oscillator scheme [see Reference 13]. Therefore, the basic switched capacitor scheme shown in FIG. 1 was selected as the basic approach for us to build on in developing our improved read-out circuit.

These and other objects, advantages and aspects of the present invention may be further understood by referring to the detailed description, accompanying Figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where.

DETAILED DESCRIPTION OF THE PREFERRED EMBODIMENTS

FIGS. 3 through 11 illustrate preferred embodiments of the capacitor pressure sensor-based transducer system of the present invention, including the improved read-out electronics incorporated therein. The first embodiment of the present invention is shown in FIGS. 3–9. Most basic features of the present invention will be described with respect to this first embodiment. The second embodiment is described with respect to FIGS. 10 and 11. Advanced features and alternative ways of electrically interfacing with the improved read-out circuitry of the present invention will also be discussed in connection with the second embodiment.

Microflowmeter Structure and Operation

Figure 3:
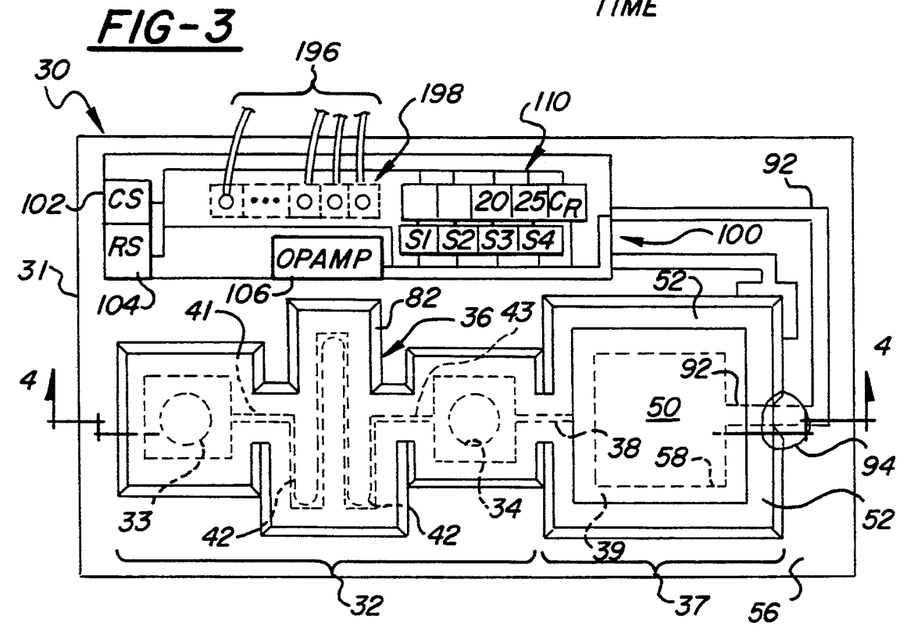
FIG. 3 is a plan view of an ultrasensitive microflowmeter of the present invention which includes a capacitive pressure transducer and employs the self-testing circuitry and method of the present invention.
Figure 4:
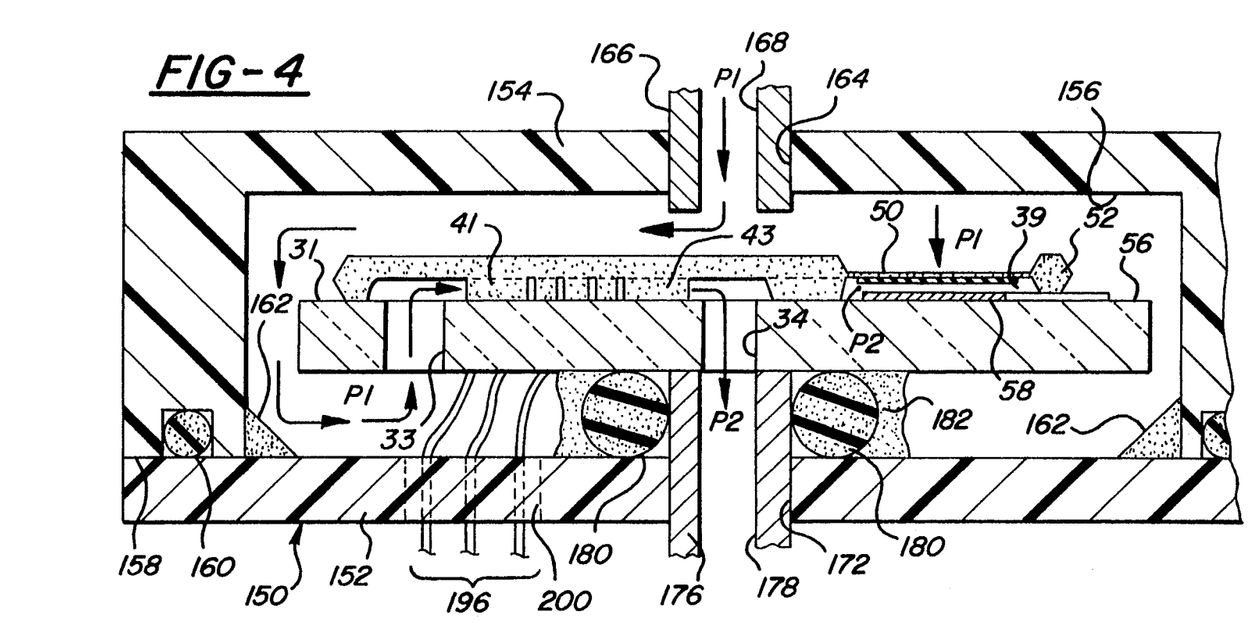
FIG. 4 is a side view in cross-section of the FIG. 3 microflowmeter taken along line 4—4 of FIG. 3, and showing its plastic housing and metal flow tubing connections, and illustrating the flow through the flowmeter.
Figure 5:
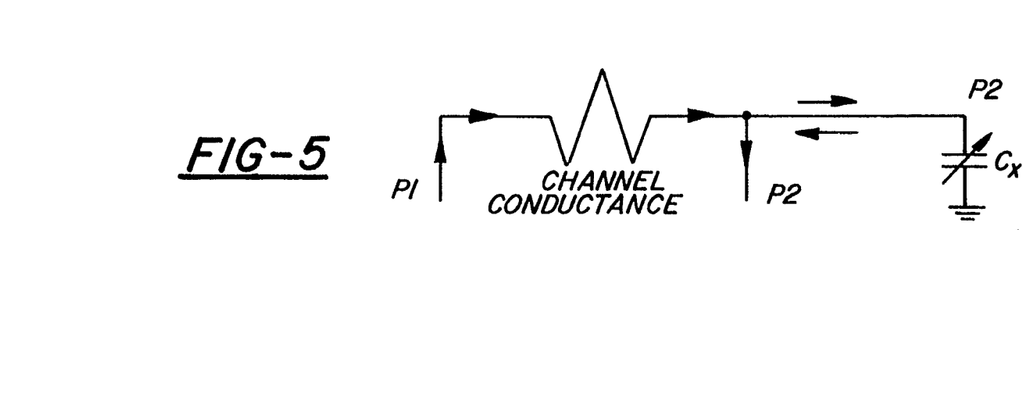
FIG. 5 is a simplified air flow circuit diagram of the FIG. 3 flowmeter to help explain its operation.

FIGS. 3 and 4 shown in plan view and cross-sectional view, respectively, the overall structure of the microflowmeter 30 used with the present invention. Its operation is straightforward enough that a simple circuit analog shown in FIG. 5 can be used to help explain the operation. The micromachined flowmeter 30 is preferably constructed on an electrically insulating substrate 31 and includes a microflow control structure 32 which includes inlet and outlet ports 33 and 34, a flow channel section 36, and a transducer section 37 which includes a passageway 38 leading to a sealed chamber 39 constituting part of the micromachined solid-state capacitive pressure sensor 40 bonded to the substrate 31. Gas flows into the transducer 30 through the inlet port 33 at pressure P1. The gas then enters a serpentine flow channel 42 at point 41 in section 36, and leaves the structure 36 at point 43 and exits through outlet port 34 at pressure P2. If the channel 42 is small enough to create a resistance to the flow, a pressure drop (P1–P2) takes place across the length of the flow channel. The flow rate is the channel conductance multiplied by this pressure difference or drop.

The pressure drop is measured by the capacitive pressure sensor 40. The pressure sensor is composed of a thin p++ boron-doped silicon membrane 50 integrally formed with and attached to a substantially enclosed rim structure 52 which suspends the membrane above the top surface 56 of the glass substrate 31. The membrane and rim structure are electrically conductive, which allows the membrane to act as one plate of a parallel plate capacitor. The membrane is centered above a metal plate 58 on the surface of the substrate 31, which is the second parallel plate. The membrane 50 and plate 58 thus form an adjustable capacitor $C_x$ since the membrane is flexible. The substantially sealed chamber 39 bounded by the membrane 50 and rim structure 52 has as its only outlet the stub channel 38 leading to the outlet port 34.

if the pressure (P1) outside the flow channel is different from the pressure (P2) at the end of flow channel at port 34, the membrane 50 deflects and the capacitance $C_x$ changes. By reading the capacitance, the pressure difference, and subsequently the flow can be determined. The pressure above the diaphragm 50 and the pressure at the inlet (P1) are kept equal on account of the way in which the top side of sensor 40 in wide open communication with the inlet port 33 and isolated from the outlet port 34.

As shown in FIGS. 3 and 4, the base of the microflowmeter 30 is preferably glass. The flow channel and pressure sensor are formed by the selective etching of silicon, as part of the same general process used to make the sensor 40. In order to measure microflow, a small channel is required. Silicon micromachining techniques are an ideal solution to the problems of channel formation since micrometer-sized dimensions are easily obtained. One preferred flow channel measures 60 μm wide×3.5 μm high×8.44 mm long, and is defined by a W-like recess etched into the original silicon surface. Still other arrangements, dimensions and constructions for the meandering micromachined channel are possible. The inlet and outlet ports may be 0.5-mm holes drilled up from the bottom into 0.8-mm-thick glass. The glass substrate acts as a strong, robust base for the sensor and as a buffer to help eliminate stray capacitance. Alternatively, the holes may be drilled or otherwise formed to extend through the silicon structure 32, and if so, the glass need not be drilled.

Microflowmeter Fabrication

Figure 6A:
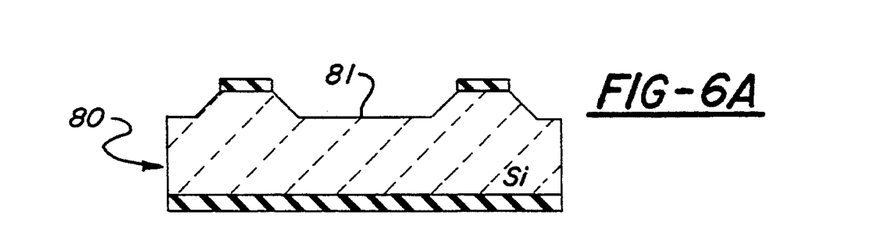
FIGS. 6A through 6D are simplified cross-sections of the pressure transducer of the present invention to help explain the fabrication sequence of the single crystal silicon flowmeter structure on a glass substrate shown in FIGS. 3 and 4.
Figure 6B:
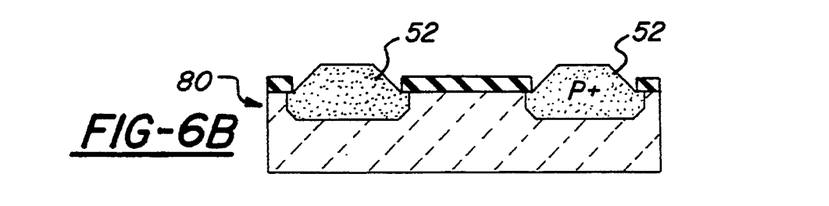
Figure 6C:
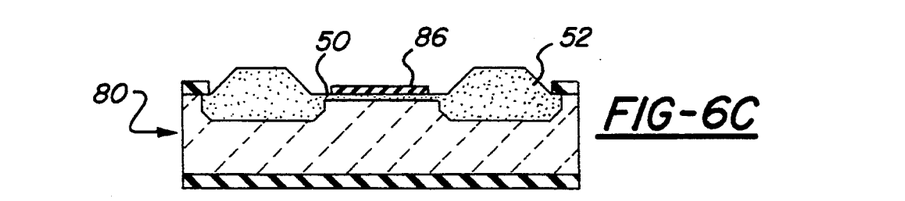

The microflowmeter 30 was fabricated using a versatile dissolved wafer process that has also been used for both an ultraminiature pressure sensor, as disclosed in U.S. Pat. No. 4,815,472, and a tactile imager, as disclosed in U.S. Pat. No. 5,055,838. The disclosures of both of these patents are hereby incorporated by reference. The fabrication sequence, shown in FIG. 6, involves both silicon and glass processing. Processing starts with a p-type (100) silicon wafer 80 of moderate doping (>1Ω·cm). Recesses, such as recess 81, are etched into the silicon using KOH, as illustrated in FIG. 6A. This recess step defines the flow channel 42 and the cavity 39 of the pressure sensor. Two high temperature (1175° C.) boron diffusions follows. The first is a deep diffusion (12–15 μm), which defines the rim 52 and the walls 82 around the flow channel 42, and the rims 83 and 84 around the ports 33 and 34 as illustrated in FIGS. 6B and FIG. 3. The second is a shallow diffusion (2.9 μm), which determines the thickness of the diaphragm 50, as illustrated in FIG. 6C. By varying the KOH etch depth and the shallow boron diffusion time, a wide variety of channel sizes and thicknesses for the membrane 50, and therefore of operating ranges and sensitivities for both the flow channel and the capacitive pressure sensor can be obtained. A 250 nm CVD oxide film 86 is then deposited on the membrane 50 to reduce the intrinsic membrane stress due to the heavy boron doping and to prevent electrical shorts from taking place across the gap in the event that overpressure conditions are encountered.

The glass processing involves depositing and patterning a three layer multi-metal system (250 nm Au/20 nm Pt/10 nm Ti) on a #7740 Corning glass wafer. The metal is patterned using conventional photolithographic techniques and forms the bottom plate of the capacitor and the output leads from the transducer. This metal system offers a highly reliable interconnect material with low resistance and good adhesion to glass. The Au-Pt-Ti does not alloy at high temperatures and is metallurgically stable; it also does not react with certain silicon etchants, such as EDP.

Figure 6D:
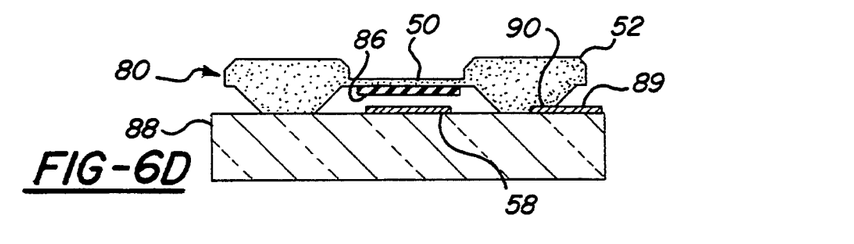

The silicon and glass wafers 80 and 88 are then electrostatically bonded together, as shown in FIG. 6D. The bonding takes place at 400° C. with a potential of 1000 V applied between the glass and silicon. In order to make electrical contact to the silicon, a metal lead 89 on the glass is allowed to overlap the silicon rim over a small area 90. The gold is removed from the metal area here to reduce the step height between the glass and silicon. During the electrostatic bonding process, the silicon and glass are drawn tightly together, ensuring a low-resistance Pt/Ti contact to the silicon (40 Ω for a 40 μm×20 μm area).

The final step in the process is a selective etch in ethylene-diamine-pyrocatechol-water (EDP). EDP dissolves the silicon and stops on the heavily doped (p+) diffused layers, leaving just patterned structure composed of the diaphragm 50 and rim structure 52 as shown in FIG. 6D, and flow channel structure shown in FIG. 3. The overall fabrication sequence requires only single-sided processing with four noncritical masking steps on silicon. The process is high yield and is compatible with batch processing. The glass is then scored or etched and broken into individual substrates 31. The total chip of completed flowmeter 30 in one prototype measured 9.7 mm×3 mm. The pressure sensor membrane in that prototype measured 2 mm×2 mm×2.9 μm and the rim was 16 μm thick. The bottom capacitor plate 58 is connected via a metal lead 92 run out externally through a lateral channel formed under the thick rim area using an extension of the recessed cavity. This lead-access channel is then sealed using a silicone plug 94. Those in the art will appreciate the various dimensions and processing parameters mentioned may be varied considerably in scaling the size of the pressure transducer up or down.

Switched Capacitor Read-Out Circuit

As shown in FIG. 3, our read-out circuit 100 is preferably located "on-chip", that is on the same substrate 31 as the micromachined transducer 37 having the adjustable capacitor $C_x$ that is to be monitored. Like the conventional switched capacitor circuit 20 shown in FIG. 1, our switched-capacitor read-out circuit 100 is comprised of basically three sections: a clock section 102, the reset switch section 104, and an op amp section 106, organized in the same basic fashion as circuit 20 in FIG. 1. The operating frequency range of the circuit 100 may vary from transducer to transducer, depending on the size, geometry and thickness of the pressure sensor, the clock section may be located off chip, particularly in the prototype development stage. An important concern in switched-capacitor circuits is "feedthrough error voltage" or "reset noise voltage". When the gate signal across the reset switch 104 goes from high to low (i.e., from pre-charge to integration), the charge built up across the gate during the pre-charge can be injected into the negative input of the op amp and create offset errors. Although there are elaborate techniques to null out this effect, we used a simple digital switch (an n-channel transistor and p-channel transistor tied together in parallel) as the reset switch in the read-out circuit 100 of the present invention to reduce this offset. Instead of building charge across the gate, the p-type transistor effectively acts as a dummy capacitor to provide an equal and opposite charge to null out the offset charge.

The most important element in the read-out circuitry is the op amp 106. To properly design it, we had to determine our minimum acceptable values for various op amp parameters. The minimum open loop gain for ap amp was determined to be 66 dB to achieve a minimum of 10 bits of resolution. In order to null out the sensitivity of the membrane 50 to electrostatic force, the clocking frequency of the circuit for a read operation should be greater than the mechanical response time of the membrane. The fundamental natural oscillation frequency for the substantially square, homogeneous diaphragm used of the pressure sensor of the prototype system of the present invention was determined to be approximately 11 KHz. A clock speed, then, of about one order of magnitude above the resonant frequency (100 KHz) was chosen as our minimum design specification to minimize resonant frequency perturberations. This translates to settling time for the op amp of less than 5 μs. The output range was limited by the value of the power supplies (±5 V in this application), since we did not want to introduce extra power supply levels into our design.

Figure 7:
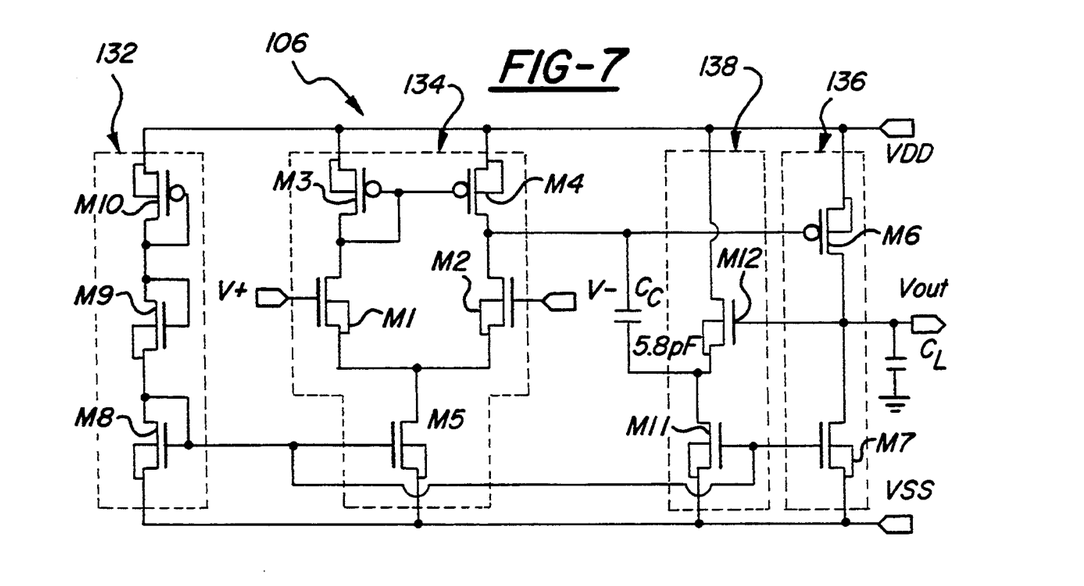
FIG. 7 is the circuit diagram of a preferred on-chip high performance CMOS operational amplifier used in the FIG. 3 flowmeter.

The detailed circuit diagram for the operational amplifier 106 of the present invention is shown in FIG. 7. There are basically four parts to the op amp: a bias string section 132, formed of transistors M8–M10; an input stage 134 formed of transistors M1–M5; an output stage 136 formed of transistors M6–M7, and a compensation stage 138 formed of transistors M11–M12 and capacitor $C_c$. The bias string sets the gate of transistor M8 to a constant voltage; this effectively sets transistors M5, M11 and M7 as current sources. The input stage is a CMOS differential amplifier which performs the differential to single-ended conversion. The output stage is a source-follower configuration which defines the output voltage swing and supplies charging currents for the load capacitance. The compensation stage provides internal phase compensation to minimize the oscillation on the output. The configuration for this stage uses a source-follower feedback to the input stage; this scheme was used to eliminate the right half plane zero and to isolate the compensation capacitor $C_c$ from the integrating capacitor $C_f$ in order to eliminate any clock feedthrough.

Before our chosen op amp circuit 106 could be effectively designed in integrated fashion in silicon, we identified and adopted certain rules to minimize the error due to device or processing effects. These rules included:

The coefficient for body effect ($\gamma$) was not well characterized in SPICE transistor model files. In order to eliminate the body effect, the substrates of all transistors were tied to the sources. Although this results in larger die sizes, area is not a critical concern in our application.

A highly precise voltage value is required for the bias string 132 since this voltage sets the quiescent operating point for all the current supplies. Typical bias strings have only two transistors and the drain and gate voltages applied across these devices are very large (5 V). Therefore, the saturation current and the voltage levels in the string are strong functions of the channel length modulation ($\lambda$). However, $\lambda$ is difficult to simulate since tills parameter is sensitive to the gate bias. In order to minimize this effect, three transistors instead of two were placed on the bias string to reduce both the drain and gate voltages. The device sizes were scaled to drop the voltage evenly between all three transistors. The total area of the bias string is also reduced since the three-transistor configuration is realized using smaller devices than the two-transistor topology.

In order to make the op amp device dimensions process insensitive, a minimum channel length of 8 μm and a minimum channel width of 15 μm were adopted as design rules. The long channel was used to eliminate channel length modulation effects and lithography inaccuracies (0.5 μm), whereas the width variation due to lateral field oxide encroachment (1.0 μm) required a larger channel width.

The output stage must drive large capacitances and a great deal of current is required. This results in very wide devices and if the devices are too large, etch problems as well as large internal parasitic capacitances become an issue. Therefore, the maximum width or length was limited to 500 μm.

Based on these rules and the minimum circuit specification for gain, frequency and output range, the op amp 106 was designed in silicon. Given these rules, the derivation of device dimensions becomes straightforward, and the techniques for doing so are well documented in the literature, and thus need not be described here. The resulting transistor sizes for our preferred op amp used in the system of the present invention is given in the following table.

TABLE 1

Operational Amplifier Transistor Sizes

| Transistor | Width (μm) × Length (μm) |
|---|---|
| M1 | 110 × 8 |
| M2 | 110 × 8 |
| M3 | 27 × 8 |
| M4 | 27 × 8 |
| M5 | 32 × 8 |
| M6 | 451 × 8 |
| M7 | 294 × 8 |
| M8 | 51 × 8 |
| M9 | 15 × 78 |
| M10 | 15 × 54.5 |
| M11 | 35 × 8 |
| M12 | 195 × 8 |

The circuitry for the op amp, reset switches and the reference capacitors were fabricated using a single-metal, double-poly CMOS process with a minimum feature size of 3 μm. The resulting fully integrated switched capacitor read-out circuit 100 in one prototype had chip dimensions of only 0.68 mm×0.9 mm, and achieved the results set forth in Table 2.

TABLE 2

Performance of the Switched Capacitor Circuit 100

| | |
|---|---|
| Open Loop Gain | 75 dB |
| 0.1% Settling Time | 2.6 μs |
| Output Range | −4.8 V to 4.8 V |
| Minimum Detectable Signal | 1 mV (1 m Torr) |
| Linearity | >10 bits |
| Power | 1.56 mW |
| Supply | ±5 V |

In designing our switched capacitor read-out circuit, it was not clear what the optimal value for the integrating capacitor Cf should be. A low-value integrating capacitor is useful for measuring very small capacitances; however, a small value capacitor limits the dynamic range of the sensor and is sensitive to parasitic capacitance.

In order to allow greater flexibility and to improve on the testability of the circuit, the op amp 106 and the integrating capacitors 110 were isolated in separate circuit sections via solid-state switches (preferably MOSFETs) S1 through S4 located adjacent to the capacitors. Several different integrating capacitors (10, 15, 20, 25 pF) coupled with small area switches (6 um×3 um) were designed; our design value of the reference capacitor was 5 pf, since the transducer zero pressure capacitance is typically 5.4–6 pF.

Microflowmeter Packaging

The last steps in the realization of an on-chip monolithic microflow transducer is to integrate the read-out electronics 100 with the microflowmeter 30 and to test the transducer against a calibrated flow rate. This requires a suitable package, which may be constructed in any number of ways. FIG. 4 shows one such package 150. This package 150 constitutes a generally rectangular housing having a base section 152 and a cover section 154 and an enclosed chamber 156 therein. The surface 156 between the base and cover sections 152 and 154 may be sealed with an O-ring 160 or other suitable materials such as adhesive or vacuum grease 162 shown in the lower corners to prevent leakage. An inlet hole 64 is provided in the cover 154 and a suitable metal tube 166 is placed therein. The tube 166 may be of any size, and its bore 168 may be of any suitable size, such as 0.5 mm. Similarly, the base 152 may be provided with an outlet hole 172 which is provided with a pipe or tube 176 provided with a bore 178 which preferably is registered or otherwise aligned with outlet port 34 in the glass substrate 31 of the microflow meter 30. The outlet hole 172 may be sealed by any suitable means from the remainder of the chamber 156. Such means may take the form of a conventional O-ring 180 placed about the end of the pipe 176 inside the housing 150, with a small amount of silicone or vacuum grease 182 placed around the O-ring.

As shown in FIGS. 3 and 4, suitable set 196 of very thin electrical lead wires may be fastened to a set 198 of bond pads of the chip 100, and extend out through a suitable hole 200 in the housing, which may be sealed with silicone or epoxy or the like. In fact, any conventional or suitable technique may be used to provide for a leak-proof interconnections of electrical conductors between the inside chamber 159 and the outside of the housing 150. The set 196 of wires, which may be as numerous as needed, lead to a conventional process controller, which provides electrical power to and acquires data in analog or digital form from the microflowmeter 30 through the readout circuit chip 100.

Those in the art will appreciate that the substrate 31 may be mounted directly to the base 152 of the housing 150, particularly if suitable arrangements are made to confine the substrate 31 to a predetermined location. Such a packaging design, a very small amount of silicone and/or vacuum grease may be used to seal the minute gap existing between the lower surface of the substrate 31 and the upper surface of the housing base 152 surrounding the outlet port 34, so as to prevent leakage through this gap.

Those in the art should also appreciate that it is practical to mount the support substrate 31 for the microflowmeter 30 within a specially designed plastic housing closing resembling a dip package with multiple external pins. In such a design, the circuitry 100 of the present invention would be within the package, but not necessarily on the same substrate, as the microflowmeter 30. Inlet and outlet ports could be provided in this specially designed dip package, and the capacitor $C_x$ could be connected by wire leads to the chip containing the circuitry 100. In this manner, the circuitry 100 would still be dedicated and in close proximity to the capacitor pressure sensor for enhanced performance and reliability.

Performance Results & Self-Test Operation

Figure 8:
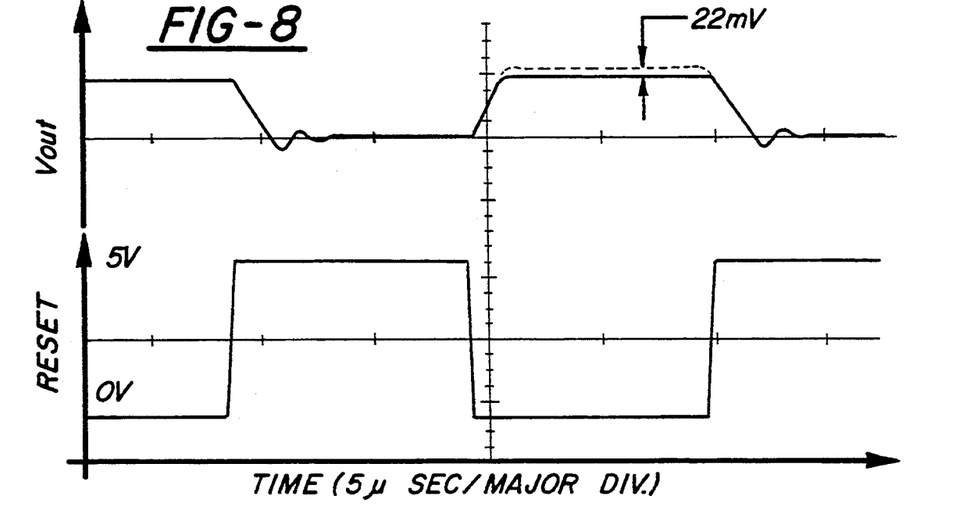
FIG. 8 are graphs of the reset and output waveforms versus time as used with the read-out circuitry in the FIG. 3 flowmeter of the present invention, showing output voltage waveforms produced with and without an electrostatically generated self-test pulse.

To evaluate the performance of our read-out circuit 100, ceramic capacitors with 10 bits of accuracy were used as input capacitors, and clock signals were generated by an HP 8018A serial data generator. The amplitude of all wave forms generated was five volts, and the output voltage response was measured using a HP 54110D digitizing oscilloscope with an accuracy of 1 to 20 millivolts depending upon the voltage scale. The basic output waveform obtained is shown in FIG. 8. The output voltage versus capacitance response was found to be linear for integrating capacitors $C_f$ equal to 10, 15, 20 and 25 pF. According to FIG. 8, the minimum integrating pulse width is in the range of 3 to 5 microseconds, which gives an equivalent operating frequency in the range of 100 KHz.

Using a 50 percent duty cycle the output signal was measured as a function of pulse width. For pulse width greater than 10 microseconds, there was evidence of a slight membrane deflection (2 millivolts or 8 fF change) due to the equivalent force generated by a time-average voltage of the waveform. For pulse widths in excess of 100 microseconds, the output voltage began to decrease, indicating that the junction leakage current of the reset switches was perturbing the output voltage. Our study suggested that the minimum clock frequency before leakage currents become a significant factor in the accuracy was in the range of 3 to 5 KHz.

When the 50 percent duty cycle pulse width is less than 10 microseconds, there is no evidence that any deflection due to electrostatic force takes place, even though the time-average voltage is 2.5 volts.

When a 5 volt self-test signal was applied continuously (by placing a 5 volt potential across the parallel plates of capacitor $C_x$), it did not cause the membrane 50 to bottom out or collapse. Thus, the $\Delta P$ effect due to this electrostatically generated force on the membrane 50 can be precisely determined independently of operating pressure by experimental test or by formula.

Although this kind of self-test pulse, applied during the precharge portion of the reset signal, caused the membrane 50 to deflect, when the voltage was removed, the membrane was immediately restored to its original position. The natural differential pressure of the system (P1-P2) and the spring characteristics of a deflected membrane both act as an immediately applied restoring force, to the diaphragm once the differential pressure is removed. During integration portion of the reset signal, both plates of the transducer capacitor are grounded and no electrostatic force exists to deflect the membrane. Note that when the clock frequency is much faster than the response time of the membrane, then the diaphragm will not respond significantly to electrostatic force. This is analogous to an RC circuit when the time constant is much larger than the pulse width of the applied voltage: the change in the output is not significant. In the same way that system functions are invisible to signals at certain frequencies, the membrane becomes transparent to the electrostatic forces produced by the read waveform if the frequency is sufficiently high. However, where the pre-charge pulse width is set to be much greater than integration pulse, then a virtual DC voltage is set up across the diaphragm 50, and it is this voltage that we use as and call the self-test signal. In effect, the time-average voltage across the capacitor is 5 volts.

Figure 9:
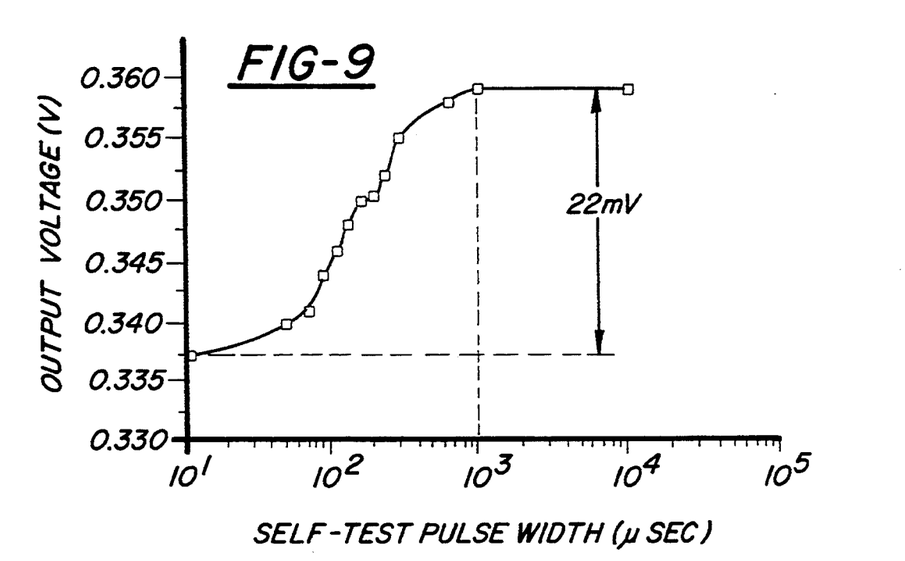
FIG. 9 is a graph showing the output voltage of the read-out electronics versus self-test pulses of various widths or durations, showing how the output voltage saturates after a lengthy but predictable amount of time.

To explore the boundaries of the electrostatic effect, the integration portion of the reset signal was set to 10 microseconds and the pre-charge portion of reset signal was varied. These efforts produced a self-test waveform shown in FIG. 8. The output voltage response versus pre-charge pulse width is shown in FIG. 9. Note that at approximately 0.6 ms, the output voltage $V_{out}$ begins to saturate, indicating that a maximum or steady-state deflection for the membrane is reached in vicinity of 0.6 msec to 1.0 msec. The total voltage change is 22 volts as shown by the dashed line in FIG. 8, which is equivalent to a pressure of 87 mTorr. It is this predictable, repeatable electrostatically induced force which permits the circuit 100 of the present invention to be used to conduct a self-test to determine whether the pressure transducer section and the read-out electronic circuit itself is operating as expected. A preferred method of the present invention that makes use of this self-test feature may be described as follows. (1) Selectively cause a self-test pulse by holding the pre-charge portion of the reset signal so that it lasts for at least 0.6 milliseconds, and preferably 1.0 millisecond, or until the maximum (steady-state) deflection of the membrane 50 is reached. Then the integration portion of the reset cycle is initiated and the resulting output voltage value is captured. This captured voltage is then compared against either the previous normal read cycle, or the successive normal read cycle. If the expected difference (e.g., 22 millivolts for our prototype) is seen between the output voltage value obtained from the normal read cycle versus the output voltage obtained immediately before in after the self-test pulse, then one may conclude that the capacitive pressure sensor section 37 and the read-out electronics circuit 100 are working properly.

Limitations of The Range of First Embodiment

The output of the multi-chip capacitive pressure sensing system is essentially comprised of two signals: the capacitive output of the pressure sensor, and the converted capacitance-to-voltage signal from 1he read-out circuitry. In order to characterize the performance limitations of the overall sensor, we examined the operational results of these two signal sources.

The full-scale extended range of the capacitive pressure sensor appears to range over five orders of magnitude (16 bits) with a maximum capacitive output of approximately 100 pF. Assuming that the practical limit of the read-out circuit resolution is approximately 1 mV, the output range of the read-out electronics is limited to about 12 bits (>three orders of magnitude); however, this is still over an order of magnitude less than the transducer. Although the integration capacitor can be increased to accommodate larger capacitances, the resolution of very small capacitance changes would then be lost. In order to extend the operating range of the circuitry, multiple integration capacitors are required.

An Extended Range Switched Capacitor Circuit

Figure 10:
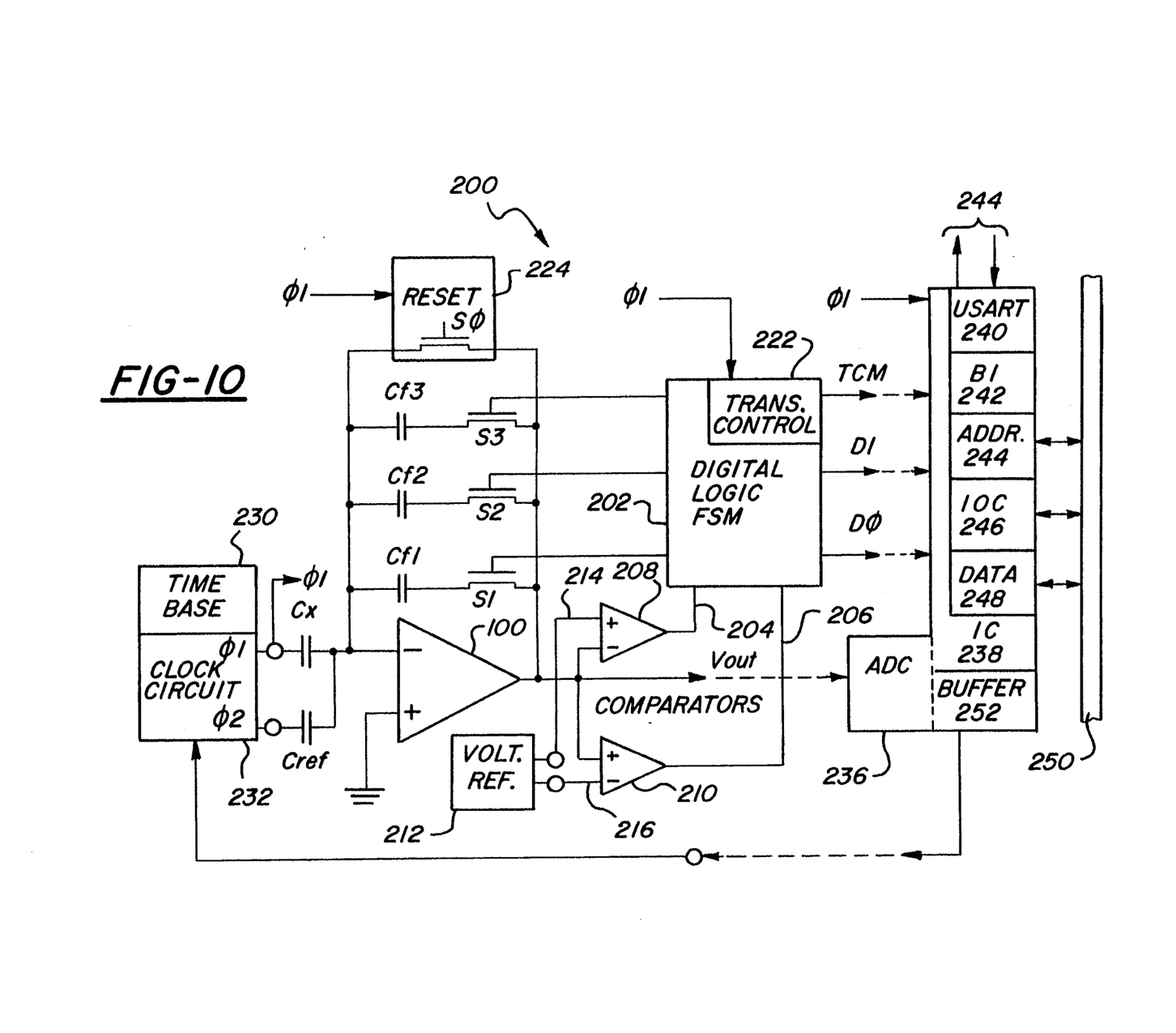
FIG. 10 is a combined circuit and block diagram showing an alternate embodiment of the present invention, which includes digital logic for automatically selecting between one of three possible integrating capacitors, to extend the performance range of the microflowmeter electronic read-out of the present invention.

We devised a further circuit and method that uses a finite state machine to select an optimal-valued integration capacitor based on the perceived operating region of the capacitive pressure sensor. This additional circuit effectively solves the problem with the limited range of the read-out circuitry in the FIG. 3 system. Our additional circuit can resolve capacitance changes over five orders of magnitude. The schematic for this circuit 200 is shown in FIG. 10.

Figure 11:
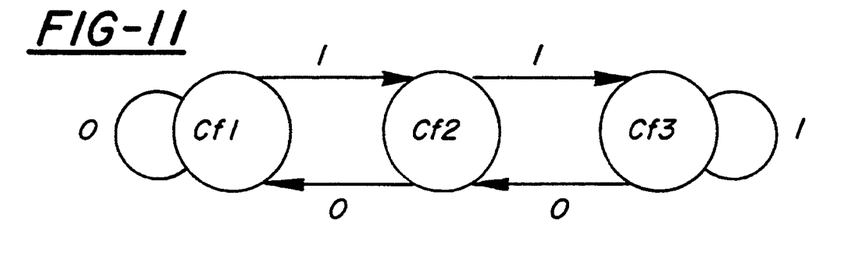
FIG. 11 is a state diagram to help explain the operation of the digital logic finite state machine (FSM) shown in the FIG. 10 circuit.

In the basic operation of circuit 200, three different integration capacitors ($C_{f1}$=5.0 pF, $C_{f2}$=50.0 pF, $C_{f3}$=150 pF) are selectively used, depending on the state chosen by the digital logic section 202. This digital logic is basically a finite state machine (FSM), which switches states according to the inputs 204 and 206 from two comparators 208 and 210. This FSM can be designed with simple digital gates or flip flops. When the state logic selects an integration capacitor, the switch in series with the capacitor (S1, S2 or S3) goes high while the other two switches stay low. The transition diagram for the state machine is shown in FIG. 11. When the voltage level is too large for a particular integrating capacitor (>4.5 V), line 206 goes high and the state machine 202 switches to the next highest valued capacitor. If the voltage level falls too low (<0.5 V), line 204 goes high, and the state machine 202 switches to the next lowest integrating capacitor. For $C_{f1}$=5.0 pF, 1 fF or 1 mTorr is resolvable; for $C_{f3}$=150 pF, 100 Torr can be measured. Therefore, circuit 200 can measure capacitance changes over five orders of magnitude.

Voltage reference block 212 supplies the appropriate reference voltages (0.5 volts and 4.5 volts) to input lines 214 and 216 leading to comparators 208 and 210. This voltage reference circuit is conventional, thus need not be further described.

The transition control portion 222 of digital logic section 202 receives a clock signal (phase 1). Similarly, block 224 drawn about the reset switch as 0 shows the solid state switches may also be controlled in synchronization with the clock signal. Thus, those in the art will appreciate that the operation switches S0 through S3 can be synchronized with the clock signals as may be necessary or desired.

Similarly, the circuit 200 may include a conventional crystal time base 230 used to provide a high accuracy master timing signal to clock circuit 232 used to generate the phase 1 and phase 2 timing signals that are used to drive the adjustable capacitor $C_x$ and reference capacitor $C_{ref}$.

Further an analog-to-digital converter 236 may be provided in the circuit 200 if desired to convert the analog output voltage $V_{out}$ into a digital signal. ADC 236 may in turn be connected through an internal control circuit 238 to a serial digital output circuit such as universal synchronous/asynchronous receiver transmitter (USART) circuit 240 or to a conventional digital bus interface 242 having parallel outputs. USART 240 operates in conventional manner to communicate over external lines 244.

Similarly, the bus interface circuit 242 may include a conventional address line port 244, and I/O control line section 246 and a data line port 248. These sections in turn may communicate with a regular computer bus 250 having multiple lines. A conventional buffer/shift register circuit 252 may also be provided for buffering digital signals within the overall interface circuit. Together interface circuits 230 through 252 provide a full complement of conventional circuits to communicate digital information either serially or in parallel with any conventional process controller.

Those in the art will appreciate that circuits 202 through 252 may be implemented in any variety of conventional or suitable ways known in the art. Thus, these circuit sections need not be further described. Circuits 202 through 252 may also be provided on-chip with operational amplifier 100 in circuit 200 if desired. Those in the art will also appreciate that, if desired, the circuit 200 of FIG. 10 may communicate with a process controller that provides the necessary clock signals and directly receives the analog output signal from the operational amplifier 100.

Conclusion

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. For example, different packaging may be employed. Also, different arrangements for clock circuits, the finite state machine or other digital circuits shown in FIG. 10 may be utilized. Accordingly, it is to be understood that the protection sought and to be afforded hereby should be deemed to extend to the subject matter defined by the appended claims, including all fair equivalents thereof.

REFERENCES

[1] S. T. Cho, D. Najafi, C. L. Lowman & K. D. Wise, "An Ultrasensitive Silicon Pressure-Based Flowmeter", IEDM Digest, December, 1989, pp. 489-502.

[2] S. T. Cho, K. Najafi & K. D. Wise, "Scaling and Dielectric Stress Compensation of Ultrasensitive Boron-Doped Silicon Microstructures", Proc. IEEE Workshop on Microelectromechanical Systems, February 1990, pp. 50-55.

[3] H. V. Allen, S. C. Terry, D. W. de Bruin, "Self-testable Accelerometer Systems", Proceedings of IEEE Conference on Micro Electro Mechanical Systems, Salt Lake City, Utah, Feb. 20-22, 1989 pp. 113-115.

[4] D. W. de Bruin, H. V. Allen, S. C. Terry, "Second-order Effects in Self-testable Accelerometers", Proc. IEEE Workshop on Solid-State Sensors and Actuators, June 1990, pp. 149-152.

[5] J. M. McCreary and D. A. Sealer, "Precision Capacitor Measurement Technique for Integrated Circuit Capacitor Arrays", IEEE Trans. Instrum. and Meas., Vol. IM-28, pp. 11-17, March, 1979.

[6] K. Watanabe and G. C. Temes, "A Switched-Capacitor Digital Capacitance Bridge", IEEE Trans. Instrum. and Meas., Vol. IM-33, pp. 247-251, December, 1984.

[7] F. Krummenacher, "A High Resolution Capacitance to Frequency Converter", IEEE Journal of Solid State Circuits, Vol. SC-20, No. 3, June, 1985.

[8] M. Smith, L. Bowman, and J. Meindl, "Analysis, Design and Performance of a Capacitive Pressure Sensor IC", IEEE Trans. on Biomedical Eng., Vol. BME-33, No. 2, pp. 163-174, February, 1986.

[9] C. S. Sander, J. W. Knutti, and J. Meindl, "A Monolithic Capacitive Pressure Sensor with Pulsed-Period Output", IEEE Trans. Electron Devices, Vol. ED-27, pp. 927-930, May, 1980.

[10] M. J. S. Smith and J. D. Meindl, "Exact Analysis of the Schmitt Trigger Oscillator", IEEE Journal of Solid-State Circuits, Vol. SC-19, December, 1984.

[11] G. J. Yeh, I. Dendo, and W. H. Ko, "Switched Capacitor Interface Circuit for Capacitive Transducers", Transducers '85, pp. 60-63, June, 1985.

[12] K. Watanabe and W.-S. Chung, "A Switched-Capacitor Interface for Intelligent Capacitive Transducers", IEEE Trans. on Instrum. and Measurement, Vol. IM-35, pp. 472-476, December, 1986.

[13] Y. E. Park and K. D. Wise, "An MOS Switched Capacitor Readout Amplifier for Capacitive Pressure Sensors", IEEE Custom Integrated Circuits Conf. Dig. Tech. Papers, pp. 380-384, 1983.

We claim:

1. A self-testable micromachined transducer apparatus for measuring at least one externally applied condition, the transducer apparatus including at least one solid-state capacitive pressure sensor, the transducer apparatus comprising:

a rigid support substrate;

a solid-state micromachined pressure sensor, formed at least in part on the support substrate and having a flexible member and a capacitor adjustable by varying pressure applied to the flexible member; and an electronic read-out circuit, electrically coupled to the solid-state pressure sensor, the read-out circuit including:

(1) a solid-state operational amplifier for producing an analog output signal corresponding to a charge applied to the adjustable capacitor, the amplifier having first and second differential input terminals, and an output terminal upon which the analog output signal is placed, with the first input terminal connected to the adjustable capacitor, (2) a reference capacitor connected to the first input terminal of the operational amplifier, (3) an integrating capacitor connected to the first input terminal and the output terminal of the operational amplifier, (4) means for providing a reset signal to the read-out circuit, the reset signal having a precharge portion and an integration portion which establishes an integration period during which the analog output signal is produced;

(5) means for applying at least one clock signal which alternates between two states substantially in synchronization with transitions between the precharge portion and the integration portion of the reset signal, to the adjustable capacitor and to the reference capacitor, with the beginning of the integrating portion coinciding with the beginning of the integration period established by the reset signal, whereby an output signal is generated on the output terminal of the operational amplifier during the integrating portion of the reset signal; and (6) means for selectively extending at least one precharge portion of the reset signal so as to cause the flexible member to deflect to a maximum steady-state deflection immediately prior to an integration portion of the reset signal, wherein the means for selectively extending causes the transducer apparatus to be self-tested by determining whether the value of the analog output signal from the operational amplifier includes an electrostatic deflection component consistent with predetermined expectations about same.

2. The self-testable apparatus of claim 1, wherein the operational amplifier is designed and constructed to have sufficient accuracy and open loop gain to provide at least 10 bits of resolution in the output signal it produces.

3. The self-testable apparatus of claim 1, wherein at least the operational amplifier is supported by the rigid substrate and located in very close proximity to the micromachined pressure sensor.

4. The self-testable apparatus of claim 1, further comprising:

a micromachined flowmeter which includes the micromachined pressure sensor, the flowmeter having an inlet port, and outlet port, and a flow channel of predetermined geometry and a predetermined gas flow conductance under specific conditions, for interconnecting the inlet and outlet ports so as to establish a differential pressure flowpath, and wherein the solid-state pressure sensor has a substantially enclosed chamber formed in part by the flexible member, and its adjustable capacitor is formed of two generally parallel electrically conductive plates, and the substantially enclosed chamber is in fluid communication with and at substantially the same pressure as outlet port of the flowmeter.

5. The self-testable apparatus of claim 4, further comprising:

a substantially enclosed housing structure including an inlet hole and an outlet hole for allowing a gas stream to flow through the housing, the housing including therein means for supporting the rigid support substrate and means for keeping the outlet hole in fluid communication with the outlet port of the flowmeter.

6. The self-testable apparatus of claim 5, wherein the means for supporting includes at least one O-ring, and a pipe extending through the housing which is positioned in the outlet hole in the housing.

7. The self-testable apparatus of claim 1, further comprising:

interface circuitry means, located in close proximity to the pressure sensor for converting the analog output signal into digital form prior to sending same to remote process control equipment, the interface means including an analog-to-digital converter having at least ten bits of accuracy for converting the analog output signal into a corresponding digital form.

8. The self-testable apparatus of claim 1, further comprising:

means for automatically comparing the value of the analog output signal to first and second values;

second and third integrating capacitors; and means for automatically connecting and disconnecting the first, second and third integrating capacitors to and from the electronic read-out circuit, depending upon the value of the analog output signal.

9. The self-testable apparatus of claim 1, further comprising:

means for comparing the current value of the analog output signal to a high reference value and a low reference value, and for generating first and second control signals indicating how the value of the analog output signal compares to the high and low reference values;

digital logic means, responsive to the control output signals, for producing first, second and third switch control signals, depending upon the state of the first and second control signals;

second and third integrating capacitors;

first, second and third switch means respectively arranged in series with first, second and third integrating capacitors, each switch means being for selectively connecting and disconnecting its respective integrating capacitor from a feedback loop of the operational amplifier, and wherein the first control switch signal is connected to the first switch means, the second control switch signals connected to the second switch means and the third control switch signals connected to the third control switch means, whereby the first, second and third integrating capacitor may be automatically switched in and out of the electronic read-out circuit in response to the states of the first and second control signals.

10. A self-testable electronic system located in immediate proximity to a miniature transducer including a solid-state capacitive pressure sensor having an adjustable capacitor with generally parallel electrically conductive plates, the capacitor being responsive to an external force, the electronic system providing electronic read-out signals corresponding to the forces sensed by the adjustable capacitor, the electronic system comprising:

a read-out circuit for reading a parameter of the adjustable capacitor correlatable to the magnitude of an external force applied to the capacitor, the read-out circuit including, (1) a solid-state amplifier for producing an output signal corresponding to a charge applied to the adjustable capacitor, the amplifier having at least a first input terminal and an output terminal upon which the output signal is placed, with the first terminal being adapted for connection to the adjustable capacitor, (2) an integrating capacitor connected to the first input terminal and the output terminal of the operational amplifier, (3) means for providing a reset signal to the read-out circuit to establish the beginning of an integration cycle, said reset signal including a precharge portion and an integration portion, (4) means for applying synchronized clock input signals in synchronization with the reset signal, and (5) means for testing the system by applying a predetermined electrostatically generated force to the adjustable capacitor, said means for testing the system extending at least one precharge portion of the reset signal so as to cause a maximum steady-state electrostatic condition on the adjustable capacitor, wherein the means for testing the system determines whether the value of the output signal from the solid-state amplifier after the steady-state electrostatic condition is placed on the capacitor is consistent with predetermined expectations.

11. A self-testing electronic system as in claim 10, wherein the means for testing selectively extends the precharge portion immediately prior to an integration portion of the reset signal.

12. A method of operating a solid state transducer which employs a capacitive pressure sensor and a switched capacitor electronic read-out circuit, the capacitive pressure sensor including at least one adjustable capacitor responsive to at least one variable external condition, the method comprising the steps of:

(a) obtaining successive read-outs with each such read-out corresponding to a value of the external conditions then sensed by the capacitor, by applying repetitively a waveform having a frequency above a first pre-determined frequency to the adjustable capacitor of the capacitive pressure transducer;

(b) generating by use of an electric signal an electrostatic force upon the capacitor of the pressure sensor by selectively holding the waveform in a predetermined state for a length of time exceeding the normal period of the cycle of the waveform by at least an order of magnitude so as to cause a maximum steady-state condition on the capacitor; and (c) after releasing the waveform from the pre-determined state, immediately obtaining a read-out from the waveform to obtain an output signal including a component due to the electrostatic force generated during the last step.

* * * * *